United States Patent
Fujito et al.

(10) Patent No.: US 12,111,297 B2
(45) Date of Patent: Oct. 8, 2024

(54) LIQUID CHROMATOGRAPH AND ANALYSIS METHOD USING LIQUID CHROMATOGRAPH

(71) Applicant: SHIMADZU CORPORATION, Kyoto (JP)

(72) Inventors: Yuka Fujito, Kyoto (JP); Logan Miller, Columbia, MD (US)

(73) Assignee: SHIMADZU CORPORATION, Kyoto (JP)

(*) Notice: Subject to any disclaimer, the term of this patent is extended or adjusted under 35 U.S.C. 154(b) by 262 days.

(21) Appl. No.: 17/962,474

(22) Filed: Oct. 8, 2022

(65) Prior Publication Data

US 2023/0128516 A1 Apr. 27, 2023

Related U.S. Application Data

(60) Provisional application No. 63/270,300, filed on Oct. 21, 2021.

(51) Int. Cl.
| | | |
|---|---|---|
| *G01N 30/38* | (2006.01) | |
| *B01D 15/18* | (2006.01) | |
| *G01N 30/02* | (2006.01) | |
| *G01N 30/22* | (2006.01) | |
| *G01N 30/24* | (2006.01) | |

(Continued)

(52) U.S. Cl.
CPC ............ *G01N 30/38* (2013.01); *B01D 15/18* (2013.01); *G01N 30/22* (2013.01); *G01N 30/8641* (2013.01); *G01N 2030/027* (2013.01)

(58) Field of Classification Search
CPC .... G01N 30/38; G01N 30/22; G01N 30/8641; G01N 2030/027; G01N 30/88; G01N 30/16; G01N 2030/201; G01N 2030/207; G01N 30/24; G01N 30/26; G01N 30/20; G01N 2030/202; B01D 15/18
See application file for complete search history.

(56) References Cited

U.S. PATENT DOCUMENTS

2016/0274069 A1* 9/2016 Fujita ................... G01N 30/32
2018/0267511 A1* 9/2018 Matsumoto .......... G05D 7/0658
(Continued)

FOREIGN PATENT DOCUMENTS

WO 2019211930 A1 11/2019

*Primary Examiner* — Peter J Macchiarolo
*Assistant Examiner* — Anthony W Megna Fuentes
(74) *Attorney, Agent, or Firm* — Renner, Otto, Boisselle & Sklar, LLP

(57) ABSTRACT

A controller of a liquid chromatograph is configured to execute, as an analysis operation in an analysis unit, a sample injection step of bringing a high-pressure valve into a loading state, sucking a sample from a tip of a needle to hold a sample in a sampling channel, then connecting the sampling channel to an injection port and bringing the high-pressure valve into an injecting state, and supplying a mobile phase from a liquid supplier, thereby injecting a sample held in the sampling channel into an analysis channel, and an analysis step of separating components of a sample injected into the analysis channel in a separation column by bringing the high-pressure valve in the loading state and supplying the mobile phase from the liquid supplier after the sample injection step is ended. The controller is configured to execute, as the analysis operation, a system cleaning step of cleaning a liquid flowing route.

14 Claims, 8 Drawing Sheets

(51) Int. Cl.
*G01N 30/26* (2006.01)
*G01N 30/86* (2006.01)
G01N 30/16 (2006.01)
G01N 30/20 (2006.01)
G01N 30/88 (2006.01)

(56) References Cited

U.S. PATENT DOCUMENTS

2020/0319146 A1* 10/2020 Hollnagel ............ G01N 30/461
2021/0148869 A1   5/2021 Yokoi et al.

* cited by examiner

LIQUID CHROMATOGRAPH AND ANALYSIS METHOD USING LIQUID CHROMATOGRAPH

BACKGROUND OF THE INVENTION

1. Field of the Invention

The present invention relates to a liquid chromatograph and an analysis method using the liquid chromatograph.

2. Description of the Related Art

A liquid chromatograph is provided with a sampling channel provided with a sampling needle at the tip, a mobile phase supply unit that sends a mobile phase, an analysis channel provided with a separation column, a high-pressure valve for switching whether or not to interpose the sampling channel between the mobile phase supply unit and the analysis channel, and the like (see WO 2019/211930 A). The sample of an analysis target is sucked from the tip of the needle and held in the sampling channel, and then the sampling channel is interposed between the mobile phase supply unit and the analysis channel to be introduced into the analysis channel together with the mobile phase supplied from the mobile phase supply unit.

SUMMARY OF THE INVENTION

When a plurality of samples are analyzed in the same analysis channel in the liquid chromatograph, it is important, in order to improve reliability of an analysis result, to reduce so-called carry-over that is a previous sample remaining in the system when analysis of a next sample is started. Although depending on the type of the sample and the like, it is found that about 20%, on average, of carry-over is derived from the sampling channel (in particular, a needle), and the remaining about 80% is derived from the analysis channel. Therefore, after the sample is introduced into the analysis channel, the sampling channel is separated from the analysis channel, measures are taken including cleaning the inside of the sampling channel with a cleaning liquid or the like and sufficiently flowing a liquid such as a mobile phase in the analysis channel after the analysis of the sample is ended.

However, it has been found that in a case where the concentration of the sample introduced into the analysis channel is equal to or greater than a certain level, even if the sampling channel and the analysis channel are separated from each other and each is sufficiently cleaned as described above, carry-over that affects the analysis result of the next sample can occur.

The present invention has been made in view of the above problems, and an object is to provide a liquid chromatograph in which carry-over that affects analysis of a next sample is unlikely to occur.

As a result of experiments, the present inventors have found that a sample remains in a high-pressure valve that switches whether or not to connect a sampling channel to an analysis channel, and particularly when the concentration of the sample is equal to or greater than a certain level, the sample remaining in the high-pressure valve becomes carry-over and affects the analysis result of the next sample. The present invention has been made based on such finding, and a subject is to remove a sample remaining in a high-pressure valve after analysis of the sample is ended.

A liquid chromatograph according to the present invention includes: a sampling channel in which a sampling needle is provided at a tip; a needle movement mechanism that moves the needle three-dimensionally; a liquid supplier configured to be able to supply at least a mobile phase; an analysis channel provided with a separation column for separating components included in a sample; a high-pressure valve having an injection port that is fluidly connected with the sampling channel when the needle is inserted and a port connected with the analysis channel, and configured to selectively switched to a loading state and an injecting state, wherein the loading state is a state for fluidly connecting the liquid supplier and the analysis channel not via the sampling channel, and the injecting state is a state for fluidly connecting the liquid supplier and the analysis channel via the sampling channel when a tip of the needle is inserted into the injection port; and a controller configured to control the needle movement mechanism, the liquid supplier, and the high-pressure valve. The liquid supplier, the analysis channel, and the high-pressure valve constitute one analysis unit for performing analysis of a sample. The controller is configured to execute, as an analysis operation in the analysis unit, a sample injection step of bringing the high-pressure valve into the loading state, sucking a sample from a tip of the needle to hold the sample in the sampling channel, then connecting the sampling channel to the injection port and bringing the high-pressure valve into the injecting state, and supplying a mobile phase from the liquid supplier, thereby injecting a sample held in the sampling channel into the analysis channel, and an analysis step of separating components of a sample injected into the analysis channel in the separation column by bringing the high-pressure valve in the loading state and supplying the mobile phase from the liquid supplier, after the sample injection step is ended, in a case where at least a predetermined condition is satisfied, after the analysis step is ended, the controller is configured to execute, as the analysis operation, a system cleaning step of cleaning a liquid flowing route from the sampling channel to the analysis channel by connecting the sampling channel to the injection port and bringing the high-pressure valve into the injecting state to supply the mobile phase and/or a cleaning liquid from the liquid supplier.

An analysis method according to the present invention is an analysis method using a liquid chromatograph. The liquid chromatograph includes: a liquid supplier configured to be able to supply at least a mobile phase; an analysis channel provided with a separation column for separating components included in a sample; and a high-pressure valve having an injection port that is fluidly connected with the sampling channel when the needle is inserted and a port connected with the analysis channel, and configured to selectively switched to a loading state and an injecting state, wherein the loading state is a state for fluidly connecting the liquid supplier and the analysis channel not via the sampling channel, and the injecting state is a state for fluidly connecting the liquid supplier and the analysis channel via the sampling channel when a tip of the needle is inserted into the injection port. The analysis method includes: a sample injection step of bringing the high-pressure valve into the loading state, sucking a sample from a tip of the needle to hold the sample in the sampling channel, then connecting the sampling channel to the injection port and bringing the high-pressure valve into the injecting state, and supplying a mobile phase from the liquid supplier, thereby injecting a sample held in the sampling channel into the analysis channel, and an analysis step of separating components of a sample injected into the analysis channel in the separation column by bringing the high-pressure valve in the loading state and supplying the mobile phase from the liquid supplier after the sample injection step is ended, in a case where at least a predetermined condition is satisfied, after the analysis step is ended, the controller is configured to execute, as the analysis operation, a system cleaning step of cleaning a liquid flowing route from the sampling channel to the analysis channel by connecting the sampling channel to the injection port and bringing the high-pressure valve into the injecting state to supply the mobile phase and/or a cleaning liquid from the liquid supplier.

According to the liquid chromatograph according to the present invention, since the liquid chromatograph is configured to execute a system cleaning step of cleaning inside of a liquid flowing route from a sampling channel to an analysis channel by connecting the sampling channel to an injection port to bring a high-pressure valve into an injecting state and supplying a mobile phase and/or a cleaning liquid from a liquid supplier after an analysis step is ended in a case where at least a predetermined condition is satisfied such as in a case where concentration of a sample is equal to or greater than a predetermined level, a channel (that is, a groove provided in a rotor) in the high-pressure valve connecting between the sampling channel and the analysis channel when the high-pressure valve becomes in the injecting state is cleaned by a mobile phase and/or a cleaning liquid supplied from the liquid supplier, and a sample remaining in the high-pressure valve is removed before analysis of a next sample is started. Due to this, a liquid chromatograph in which carry-over that affects analysis of a next sample is unlikely to occur is provided.

According to the analysis method according to the present invention, since a system cleaning step of cleaning inside of a liquid flowing route from a sampling channel to an analysis channel is executed by connecting the sampling channel to an injection port to bring a high-pressure valve into an injecting state and supplying a mobile phase and/or a cleaning liquid from a liquid supplier after an analysis step is ended in a case where at least a predetermined condition is satisfied such as in a case where concentration of a sample is equal to or greater than a predetermined level, a channel in the high-pressure valve connecting between the sampling channel and the analysis channel when the high-pressure valve becomes in the injecting state is cleaned by a mobile phase and/or a cleaning liquid supplied from the liquid supplier, and a sample remaining in the high-pressure valve is removed before analysis of a next sample is started. Due to this, a liquid chromatograph in which carry-over that affects analysis of a next sample is unlikely to occur is provided.

DETAILED DESCRIPTION OF THE INVENTION

An embodiment of a liquid chromatograph and an analysis method according to the present invention will be described below with reference to the drawings.

Figure 1:
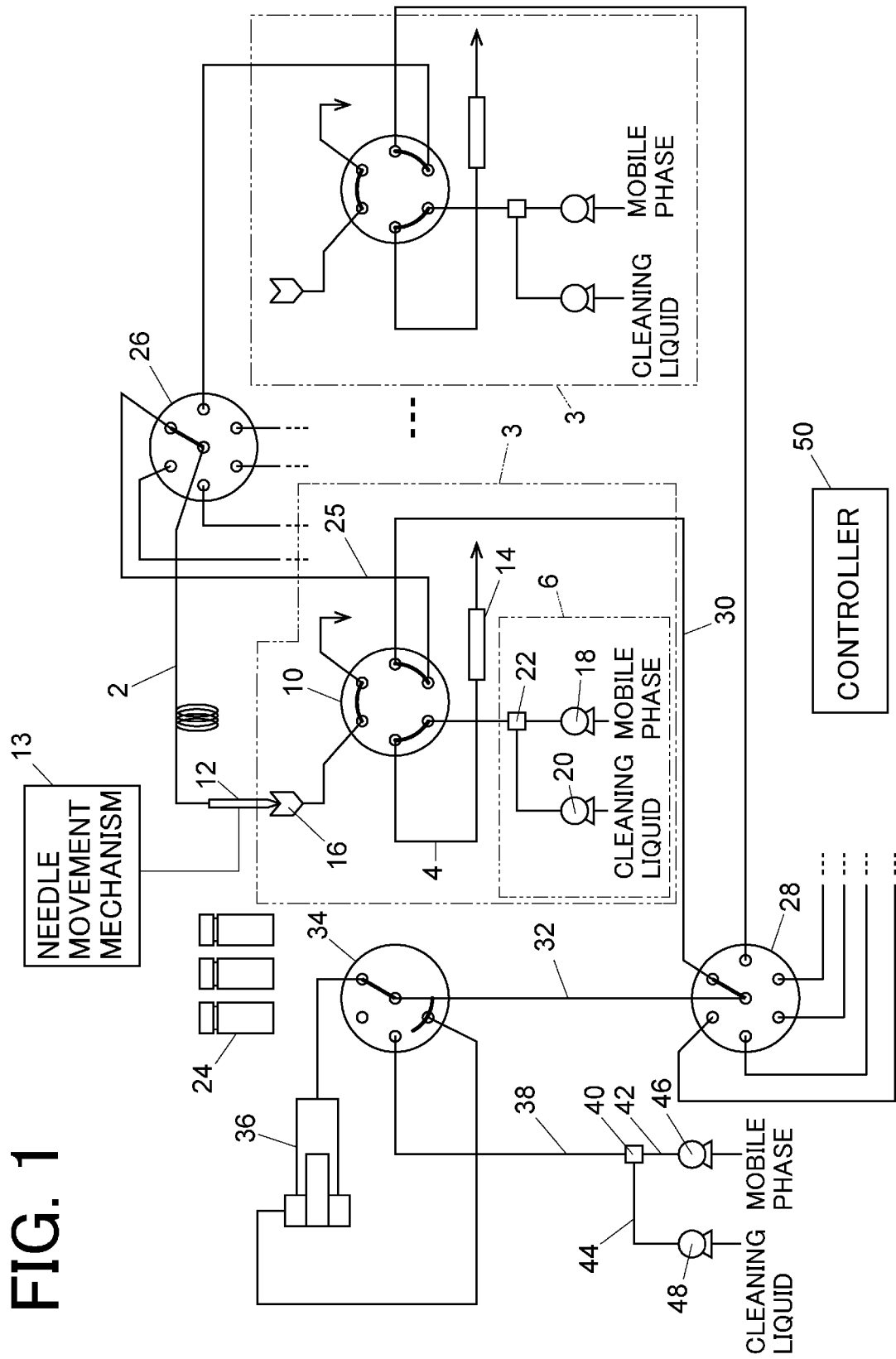
FIG. 1 is a configuration diagram illustrating an example of a liquid chromatograph.

An example of the liquid chromatograph will be described with reference to FIG. 1. Note that, here, Multiplex LC configured to include a plurality of analysis units 3 that perform sample separation and to be able to simultaneously execute sample separation analysis will be described as an example, but the present invention is not limited to this, and can be similarly applied to a liquid chromatograph provided with only one stream.

The liquid chromatograph of this example includes a sampling channel 2, a plurality of analysis units 3, a needle movement mechanism 13, selection valves 26 and 28, a low-pressure valve 34, a measuring pump 36, and a controller 50.

A base of the sampling channel 2 is connected to a common port of the selection valve 26, and a tip includes a needle 12 for sampling. The needle 12 operates three-dimensionally by the needle movement mechanism 13, and the base of the sampling channel 2 is fluidly connected to the measuring pump 36, so that a sample accommodated in a sample container 24 disposed at a predetermined position can be sucked from the tip and held. Furthermore, the needle 12 can move to the position of an injection port 16 provided in a high-pressure valve 10 of each analysis unit 3. The injection port 16 of each analysis unit 3 is fluidly connected to the sampling channel 2 by inserting the tip of the needle 12 into the injection port 16 of each analysis unit 3.

Although only one analysis unit 3 among the plurality of analysis units 3 is given a reference numeral in the drawings, the analysis units 3 have the same configuration.

The analysis unit 3 includes an analysis channel 4, a liquid supplier 6, and the high-pressure valve 10. The high-pressure valve 10 is a two-position valve including six ports on the same circumference and switching a connection state between adjacent ports. One port of the high-pressure valve 10 is the injection port 16. One of the ports adjacent to the port leading to the injection port leads to a drain, and an upstream end of the analysis channel 4 is connected to the other. The liquid supplier 6 is connected to a port positioned on an opposite side of the port leading to the injection port 16 among the ports connected with the upstream end of the analysis channel 4. The remaining two ports of the high-pressure valve 10 are connected to channels 25 and 30, respectively.

The analysis channel 4 includes a separation column 14 for separating a component in the sample. Although not illustrated, the analysis channel 4 leads to a detector such as a mass spectrometer for detecting a component separated in the separation column 14. The liquid supplier 6 includes a pump 18 for sending a mobile phase, a pump 20 for supplying a cleaning liquid, and a switching valve 22, and is configured to be able to switch the liquid supplied by the switching valve 22 between the mobile phase and the cleaning liquid. Although the liquid supplier 6 is illustrated so as to supply one type of mobile phase and one type of cleaning liquid in the drawings, the liquid supplier 6 may be configured to be able to supply a plurality of types of mobile phases and cleaning liquids simultaneously or in a switching manner.

The selection valve 26 has a plurality of selection ports, and each selection port is connected to one selection port of the high-pressure valve 10 of each of the plurality of analysis units 3 via the channel 25. The selection valve 26 can selectively cause one selection port of the plurality of selection ports to fluidly communicate with the common port. That is, the selection valve 26 is for selecting a connection destination of the base of the sampling channel 2 from the high-pressure valve 10 provided in each of the plurality of analysis units 3.

A selection valve 28 includes one common port and a plurality of selection ports. Each selection port of the selection valve 28 is connected to one selection port of the high-pressure valve 10 of each of the plurality of analysis units 3 via the channel 30. The common port of the selection valve 28 is connected to a common port of the low-pressure valve 34 via a channel 32. A syringe pump 36 and a liquid sending channel 38 are connected to a selection port of the low-pressure valve 34. The liquid sending channel 38 is connected with a mobile phase supply channel 42 and a cleaning liquid supply channel 44 via a switching valve 40, and the mobile phase and/or the cleaning liquid is sent through the liquid sending channel 38. Each of the mobile phase and the cleaning liquid supplied through the mobile phase supply channel 42 and the cleaning liquid supply channel 44 may be the same as the mobile phase and the cleaning liquid supplied from the liquid supplier 6.

The high-pressure valve 10 of the analysis unit 3 can be switched between a loading state (state of FIG. 1) for fluidly connecting the liquid supplier 6 and the analysis channel 4 not via the sampling channel 2 and an injecting state (state of FIG. 2) in which the sampling channel 2 is interposed between the liquid supplier 6 and the analysis channel 4. In the loading state, the high-pressure valve 10 provides fluid communication between the port connected with the liquid supplier 6 and the port connected with the analysis channel 4. In the injecting state, the high-pressure valve 10 causes the injection port 16 and the port connected with the analysis channel 4 to fluidly communicate with each other, and causes the port connected with the liquid supplier 6 and the port connected with the channel 25 to fluidly communicate with each other.

The controller 50 is implemented by an electronic circuit including a central processing unit (CPU) and an information storage device. The controller 50 controls the operation of each analysis unit 3 (high-pressure valve 10 of each analysis unit 3, pump 18, pump 20, and switching valve 22), the needle movement mechanism 13, the selection valve 26, the selection valve 28, the low-pressure valve 34, the syringe 36, the switching valve 40, a pump 46, and a pump 48. The controller 50 is configured to execute a sample injection step, an analysis step, and a system cleaning step as a process of analysis operation in each analysis unit 3.

Figure 2:
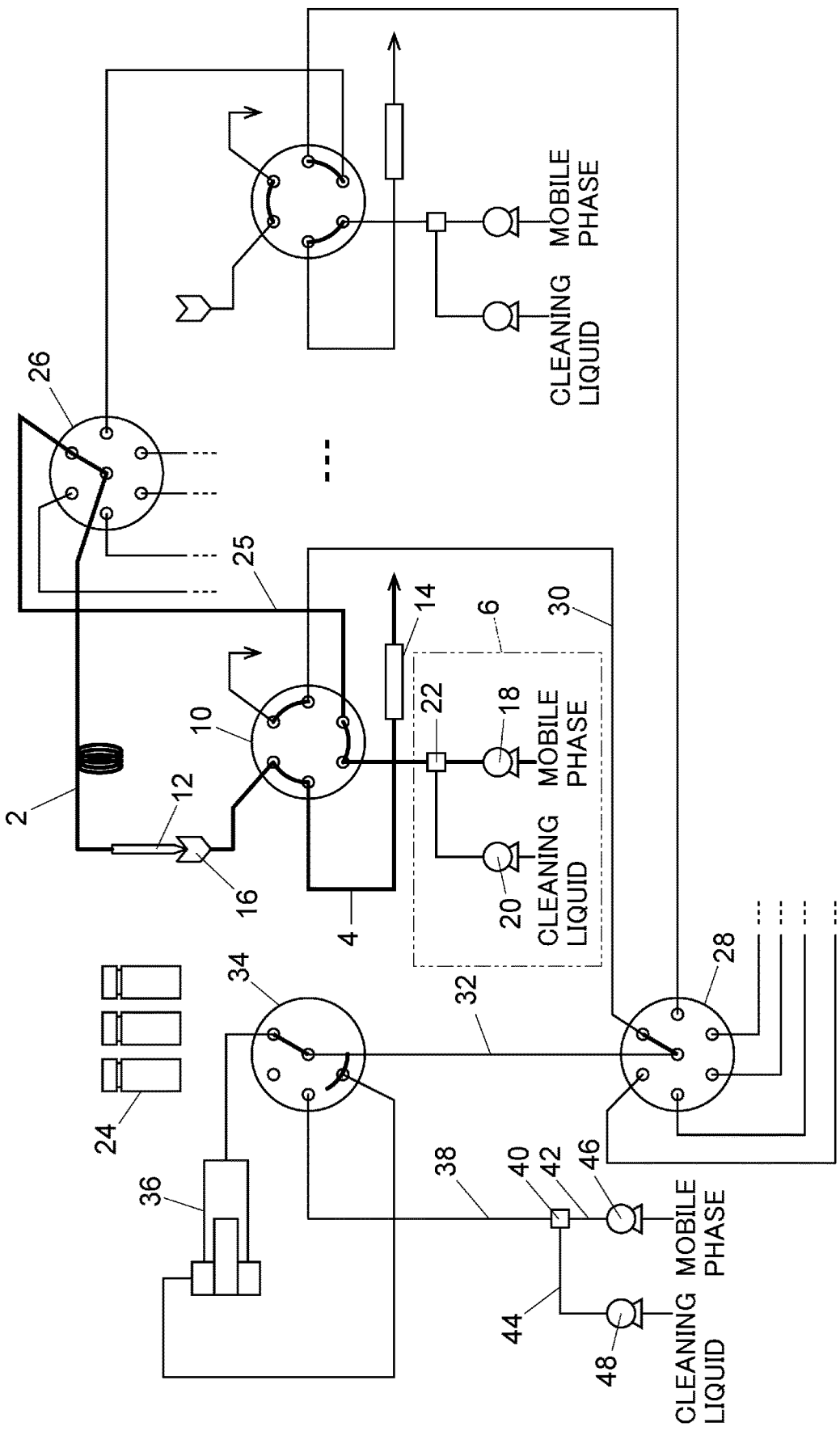
FIG. 2 is a view illustrating an example of a channel configuration at the time of sample injection of the example.

In the sample injection step, after the sample accommodated in the sample container 24 is collected into the sampling channel 2, as illustrated in FIG. 2, one analysis unit 3 is selected by the selection valves 26 and 28, the needle 12 is inserted into the injection port 16 of the selected analysis unit 3, the high-pressure valve 10 of the analysis unit 3 is brought into the injecting state, and the mobile phase is supplied from the liquid supplier 6. When the mobile phase supplied from the liquid supplier 6 flows in the sampling channel 2 toward the analysis channel 4, the sample held in the sampling channel 2 is introduced into the analysis channel 4 together with the mobile phase.

Figure 3:
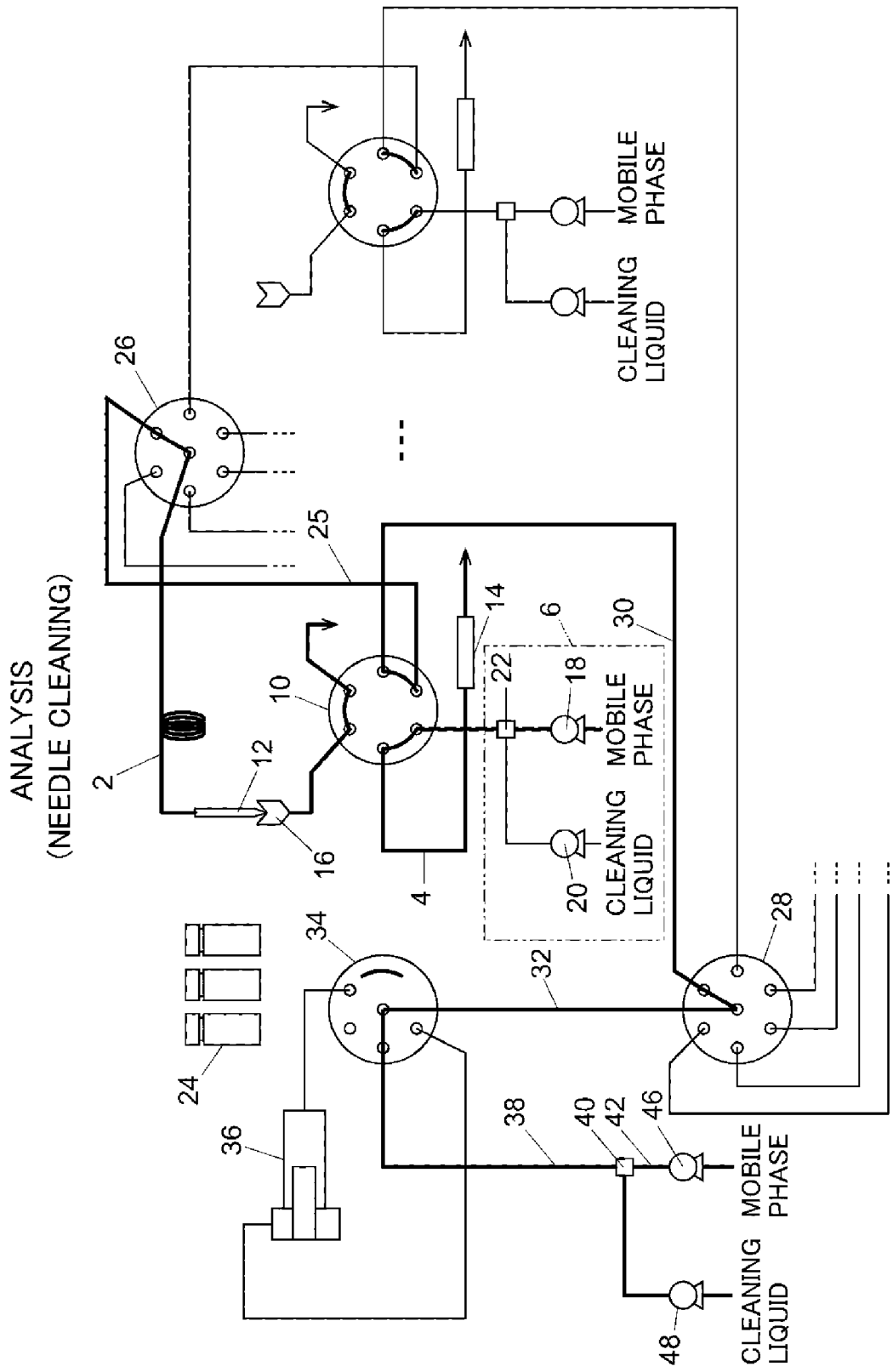
FIG. 3 is a view illustrating an example of a channel configuration at the time of needle cleaning of the example.

In the analysis step, as illustrated in FIG. 3, the high-pressure valve 10 is brought into the loading state, the sample introduced into the analysis channel 4 by the mobile phase from the liquid supplier 6 is guided to the separation column 14, and the components separated from each other and eluted from the separation column 14 are introduced into the detector connected to the analysis channel 4 and detected.

Figure 6:
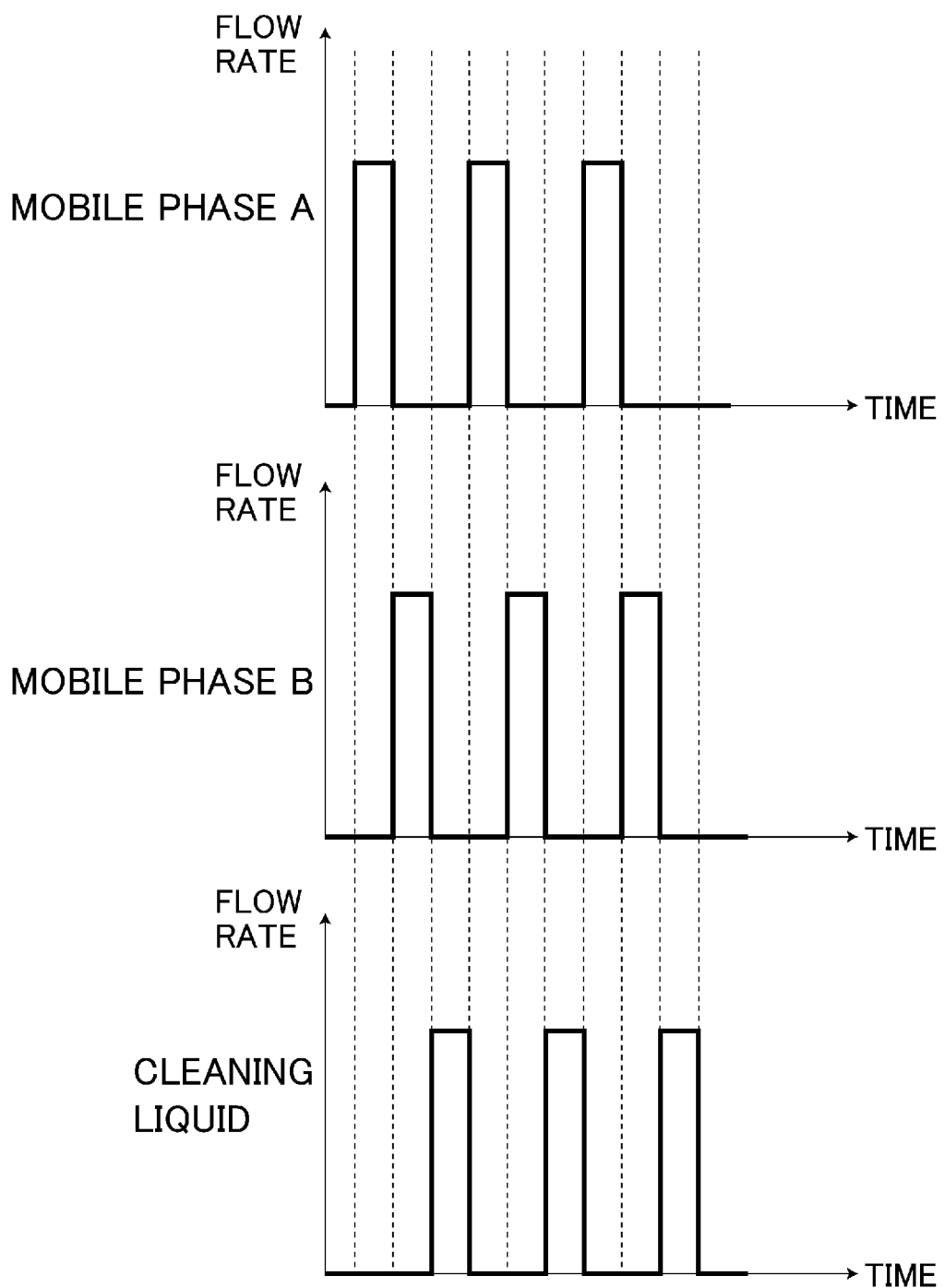
FIG. 6 is a time chart illustrating a liquid sending state of each liquid at the time of cleaning of the example.

During the execution of the above analysis step, the sampling channel 2 is separated from the mobile phase liquid sending unit 6 and the analysis channel 4. Therefore, as illustrated in FIG. 3, it is possible to simultaneously execute the needle cleaning step of supplying the cleaning liquid from the cleaning liquid supply channel 44 to the sampling channel 2 in a state where the tip of the needle 12 is inserted into the injection port 16. In this needle cleaning step, the composition of the liquid flowing in the sampling channel 2 can be temporally changed using the mobile phase and the cleaning liquid. For example, as illustrated in FIG. 6, a stepwise method of switching, for a certain period of time (for example, 0.1 to 0.5 minutes), the liquid to be supplied to the sampling channel 2 may be adopted, or a gradient method of changing the concentration ratio of each liquid with time may be adopted. By executing this needle cleaning step, it is possible to clean the inside of the sampling channel 2 including the needle 12 and the inside of the injection port 16.

While one analysis unit 3 is executing the analysis step, another analysis unit 3 can execute the sample injection step described above.

Figure 4:
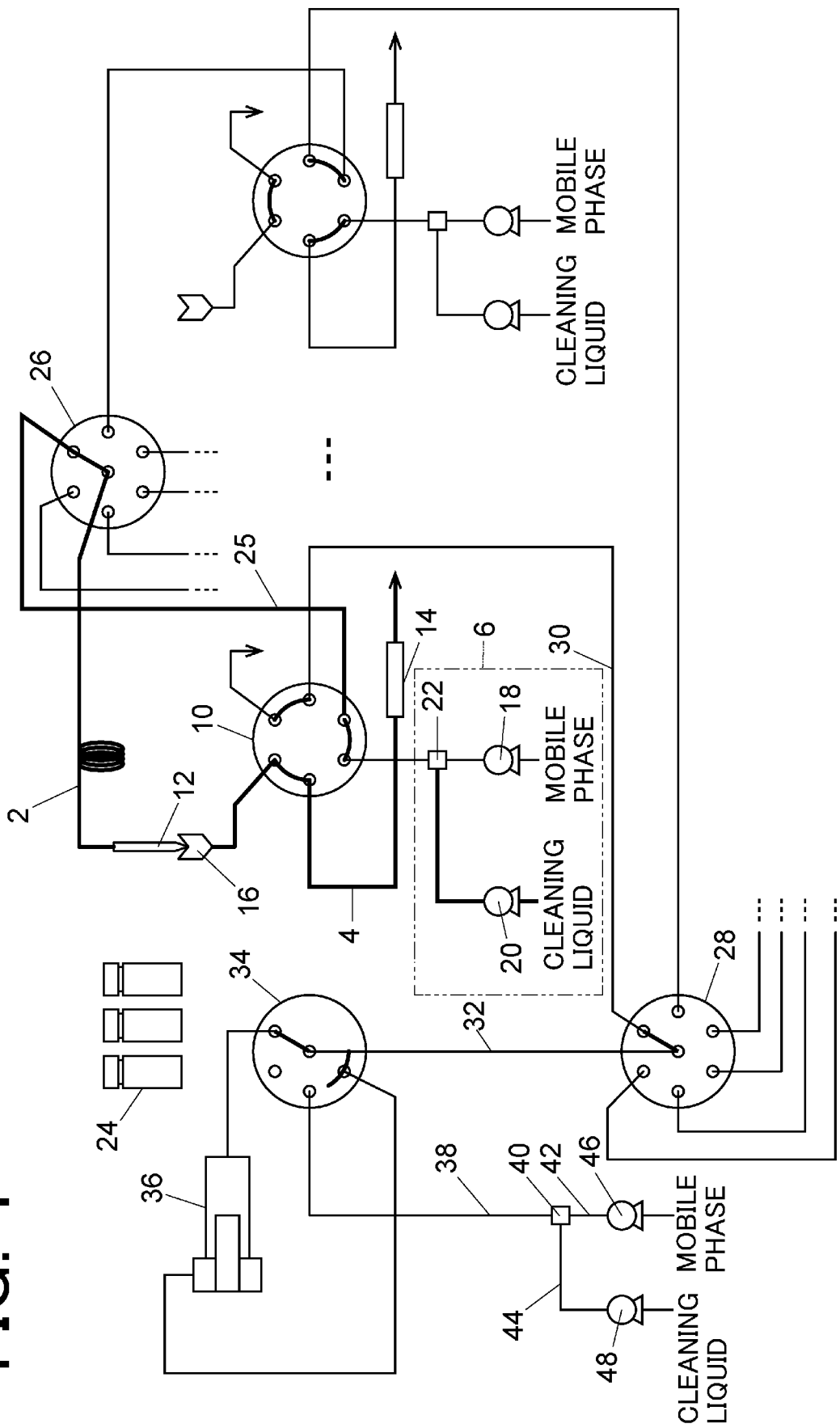
FIG. 4 is a view illustrating an example of a channel configuration at the time of system cleaning of the example.

In the system cleaning step, the selection valves 26 and 28 select one analysis unit 3 to be subjected to system cleaning, and as illustrated in FIG. 4, the needle 12 is inserted into the injection port 16 of the selected analysis unit 3, the high-pressure valve 10 of the analysis unit 3 is brought into the injecting state, and the cleaning liquid is supplied from the liquid supplier 6. Also in this system cleaning step, similarly to the needle cleaning step, the composition of the liquid supplied from the liquid supplier 6 can be changed using the mobile phase and the cleaning liquid.

The above-described system cleaning step can be executed at an arbitrary timing by the analysis unit 3 in which the analysis step is ended. In the system cleaning step, it is possible to clean not only the sampling channel 2 and the analysis channel 4 but also a channel (a groove of a rotor for providing fluid communication between the port connected with the analysis channel 4 and the injection port 16) in the high-pressure valve 10. The sample remaining in the high-pressure valve 10 can be removed. However, this system cleaning step is not necessarily executed in the analysis unit 3 in which the analysis step is ended, and may be executed only when a predetermined condition is satisfied. Conditions under which the system cleaning is executed include the concentration of the sample that is equal to or greater than a predetermined level, setting in which the system cleaning is executed after analysis of the sample by the user, and an output signal of the detector obtained by injecting a solvent (blank liquid) not containing the sample into the analysis channel 4 after the end of the analysis step that exceeds a predetermined level.

A series of operations related to analysis achieved by the controller 50 will be described with reference to FIGS. 1 to 4 and the flowchart of FIG. 5.

In analysis of the sample, the controller 50 selects the analysis unit 3 to be used for analysis of the sample by the selection valves 26 and 28, collects the sample by the needle 12 from the sample container 24, and inserts the needle 12 into the injection port 16 of the selected analysis unit 3. Then, as illustrated in FIG. 2, the high-pressure valve 10 of the selected analysis unit 3 is switched to the injecting state, and a mobile phase is supplied from the liquid supplier 6, thereby executing the sample injection step of injecting the sample into the analysis channel 4 of the analysis unit 3 (step 101).

When a predetermined time has elapsed after the high-pressure valve 10 is switched to the injecting state, the controller 50 judges that all the samples held in the sampling channel 2 have been injected into the analysis channel 4 (the sample injection step is ended), switches the high-pressure valve 10 to the loading state (the state of FIG. 1), and starts the analysis step (step 102). In the analysis step, the sample injected into the analysis channel 4 is guided to the separation column 14 by the mobile phase supplied from the liquid supplier 6, and components in the sample are separated from each other and detected by the detector.

During the above analysis step, the controller 50 executes the needle cleaning step of supplying the cleaning liquid (and the mobile phase) from the cleaning liquid supply channel 44 to the sampling channel 2 in a state where the tip of the needle 12 is inserted into the injection port 16 (step 103). Furthermore, the controller 50 selects the analysis unit 3 (another analysis unit) to be used for analysis of the next sample by the selection valves 26 and 28, collects the next sample from the tip of the needle 12, and injects it into the analysis channel 4 of the other analysis unit 3 (step 104). After end of the sample injection step in the other analysis unit 3, the controller 50 switches the high-pressure valve 10 of the other analysis unit 3 to the loading state and starts the analysis step in the other analysis unit 3 (step 105). Thereafter, the controller 50 supplies the cleaning liquid (and the mobile phase) from the cleaning liquid supply channel 44 to the sampling channel 2 while maintaining the state where the tip of the needle 12 is inserted into the injection port 16 of the other analysis unit 3, for example, thereby executing the needle cleaning step (step 106).

Thereafter, after the analysis of the sample by the analysis unit 3 that has executed the sample injection step in step 101 is ended (step 107), the controller 50 judges whether or not to execute system cleaning (step 108), and executes the system cleaning when the system cleaning is to be executed (step 109).

Whether or not to execute the system cleaning can be judged on the basis of information (for example, in addition to the concentration of the sample, information on presence or absence of execution of the system cleaning after the analysis of the sample is ended) regarding the sample input in advance by the user, for example, or on the basis of a determination result as to whether or not the output signal of the detector obtained by the analysis of the sample exceeds a predetermined level. That is, whether or not to execute the system cleaning after the analysis of the sample is ended can be judged by whether or not the concentration of the sample injected in the sample injection step of step 101 is equal to or greater than a predetermined level. After the analysis of the sample is ended, the level of carry-over in the system is actually measured, and whether or not the system cleaning is to be executed may be judged depending on whether or not the level exceeds the predetermined level. For example, after the analysis of the sample in the analysis unit 3 is ended, similarly to a normal sample, "blank injection" of introducing a blank liquid (for example, a mobile phase, a solvent, or the like) not containing a sample into the analysis channel 4 is executed to acquire an output signal of the detector for the blank liquid, and if the acquired output signal exceeds a predetermined level, it can be judged that the system cleaning is to be executed. Note that the controller 50 may be configured to always execute the system cleaning once after the analysis step in the analysis unit 3 is ended.

Here, the blank injection includes the following two operations. One operation as blank injection is an operation in which a solvent not containing a sample is used as a blank liquid, the needle 12 is connected to the injection port 16 in a state where the blank liquid is held in the sampling channel 2, the high-pressure valve 10 is brought into the loading state, and the blank liquid held in the sampling channel 2 is introduced into the analysis channel 4. The other operation as the blank injection is an operation in which a mobile phase not containing a sample is used as a blank liquid, the needle 12 is connected to the injection port 16, the high-pressure valve 10 is brought into the loading state, and the mobile phase that is the blank liquid is introduced into the analysis channel 4. The "blank injection" below may be any of the above two operations.

Thereafter, the controller 50 executes the blank injection, and determines the presence or absence of carry-over on the basis of the level of the output signal of the detector for the blank liquid obtained at that time (steps 110 and 111). As a result of the blank liquid measurement, if it is determined that there is no carry-over, the series of analysis operations of the sample in the analysis unit 3 ends. After end of the series of analysis operations, the analysis unit 3 is brought into a state of being able to be used for analysis of another sample. On the other hand, if it is determined in step 111 that there is carry-over, the controller 50 returns to step 108 and executes the system cleaning. As indicated by a broken line arrow in FIG. 5, the controller 50 may be configured to repeat blank injection until it is determined in step 111 that there is no carry-over. By executing the blank injection, it is possible to wash away, to some extent, the carry-over component remaining in the liquid flowing route from the sampling channel 2 to the analysis channel 4 through which the sample passes, and thus it is possible to eliminate, to some extent, the carry-over by repeating the blank injection.

Figure 5:
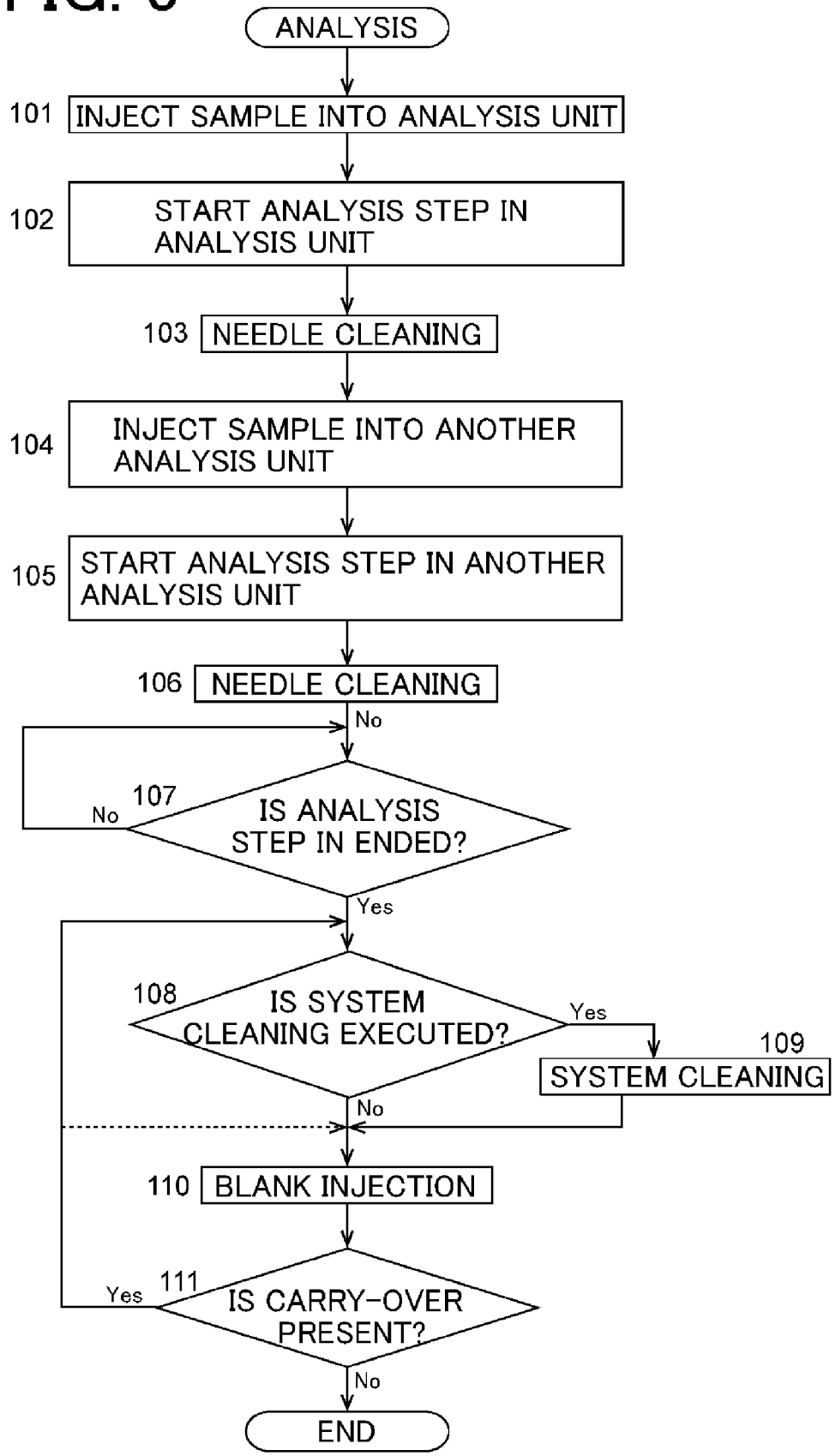
FIG. 5 is a flowchart for explaining an example of operation of the example.

Note that the order and the number of steps illustrated in FIG. 5 are merely examples, and can be freely rearranged as necessary. For example, in the example of FIG. 5, after the analysis step in the analysis unit 3 is started in step 102 and before the analysis step is ended, the sample injection step (step 104) is executed by the other analysis unit 3 to start the analysis step (step 105). This gives effects of improving the efficiency of the analysis of the plurality of samples, and shortening the time required until the analysis of all the samples is ended. However, the present invention is not limited to this, and it is not always necessary to execute the analysis steps in the plurality of analysis units 3 in parallel. Steps 110 and 111 are not necessarily steps to be executed, and may be omitted.

Figure 7:
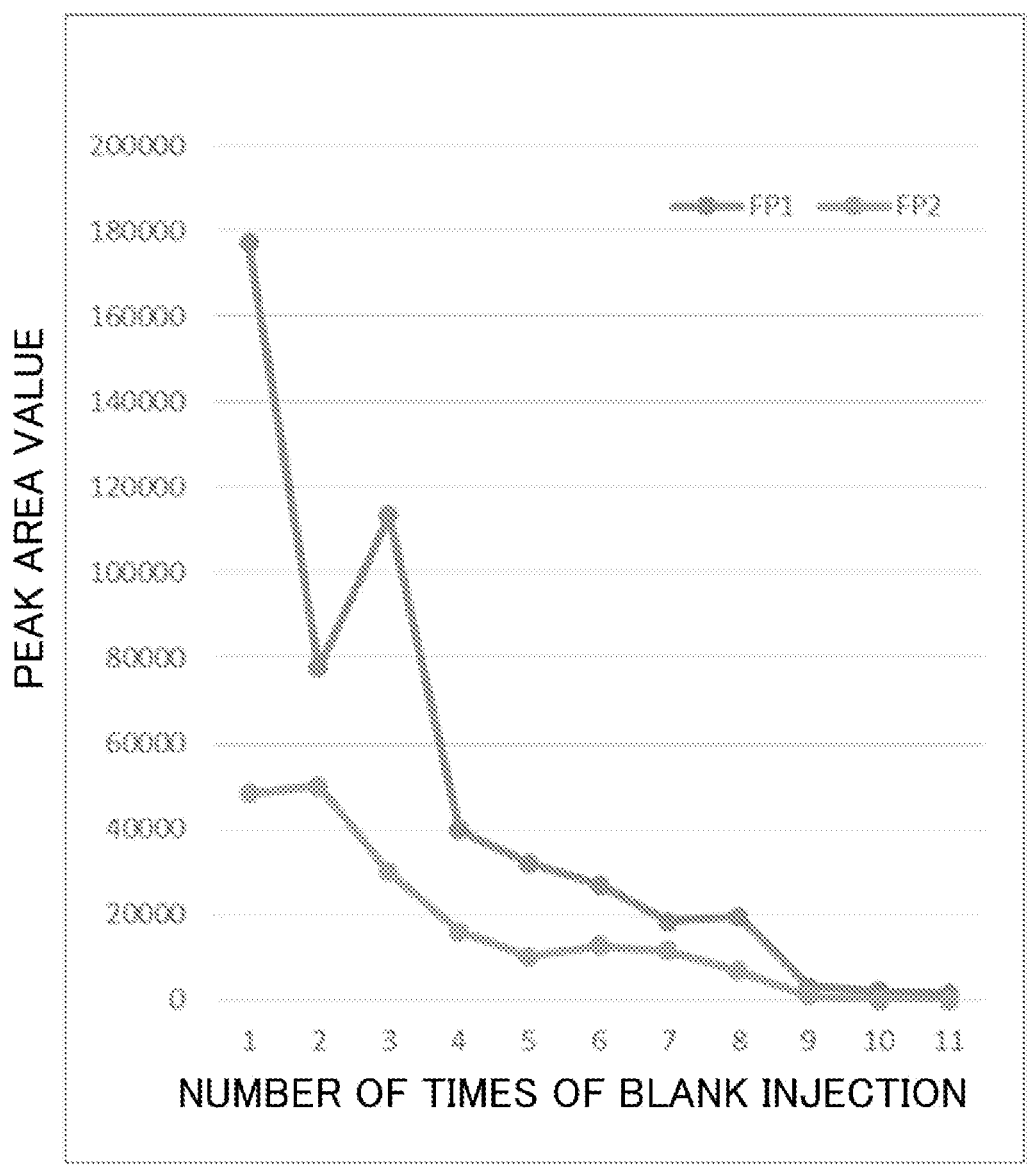
FIG. 7 is a graph illustrating a verification result of a relationship between the number of times of blank injection and a carry-over amount.

FIG. 7 illustrates a result of continuously performing blank injection a plurality of times after executing analysis of the sample in two analysis units 3 (FP1 and FP2). In FIG. 7, the vertical axis represents the peak area value, and the horizontal axis represents the number of times of blank injection.

As seen from both results of FP1 and FP2, when the carry-over amount decreases to a certain level by performing the blank injection a plurality of times, the ratio of decrease of the carry-over amount becomes small, or it is brought into a stagnation state where the carry-over amount does not decrease even if the blank injection is further performed. In this stagnation state, when the high-pressure valve 10 is switched to the injecting state, the sampling channel 2 is interposed between the liquid supplier 6 and the analysis channel 4, and a state where the mobile phase is allowed to flow in the rotor groove that provides fluid communication between the port connected with the analysis channel 4 in the high-pressure valve 10 and the injection port 16 is maintained for a certain period of time, and then blank injection is performed (eighth and subsequent times), the carry-over amount decreases. This result indicates that the carry-over component remains in a channel portion where the solution flows only at the time of sample injection into the analysis channel 4 in the high-pressure valve 10, and the carry-over amount can be reduced by flowing the solution to the channel portion separately from the time of sample injection.

Figure 8:
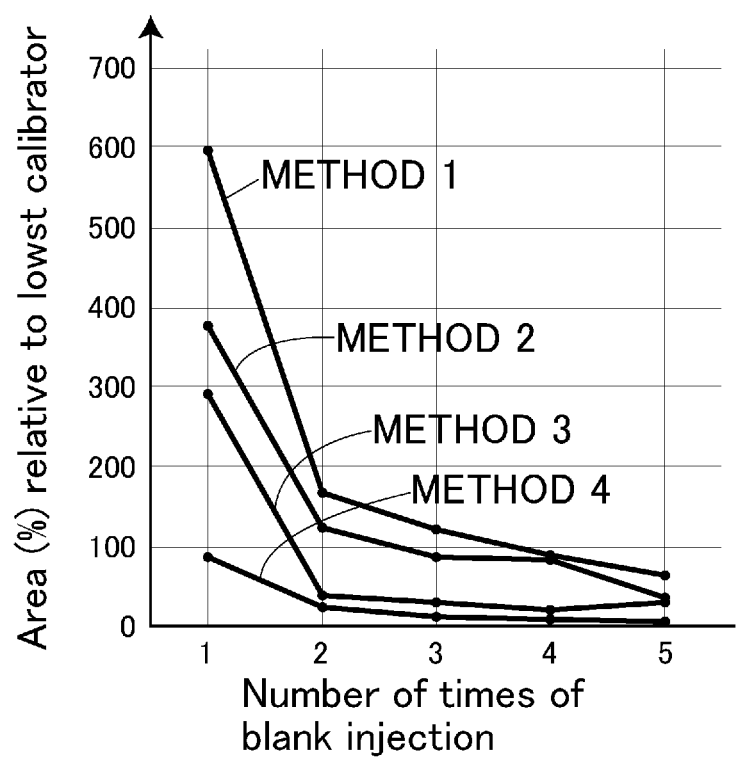
FIG. 8 is a graph illustrating a verification result of a carry-over elimination effect by system cleaning.

FIG. 8 is a graph illustrating a verification result of a carry-over elimination effect by system cleaning. The vertical axis of this graph represents the ratio (area % relative to lowest calibrator) of carry-over with respect to a quantitation limit value (LOQ), and the horizontal axis represents the number of times of blank injection. In this verification, two kinds of solvents (mobile phase A: formic acid$^+$ammonium formate in water, and mobile phase B: methanol$^+$ Acetonitrile) were used as a mobile phase, a sample containing a certain component at a high concentration was analyzed, and then the presence or absence of carry-over was confirmed using a detector (mass spectrometer) signal at the time of blank injection. In each of the needle cleaning, the cleaning of the analysis channel 4 (the cleaning liquid and the mobile phase are supplied from the liquid supplier 6 with the high-pressure valve 10 brought in the loading state), and the system cleaning, in addition to the mobile phases A and B described above, acetonitrile/acetone and formic acid were used as the cleaning liquid, and the composition of the liquid flowing through the sampling channel 2 and/or the analysis channel 4 was switched at intervals of 0.5 minutes in the order of the mobile phase B, the mobile phase A, and the cleaning liquid by the stepwise method as in FIG. 6.

In the verification of FIG. 8, in method 1, needle cleaning after end of sample injection into the analysis channel 4 was performed, and blank injection was performed without performing system cleaning after the end of the analysis. In method 2, the system cleaning after the end of the analysis was performed without performing the needle cleaning after the end of the sample injection into the analysis channel 4, and then the blank injection was performed. In method 3, needle cleaning after the end of the sample injection into the analysis channel 4 and cleaning of the analysis channel 4 after the end of the analysis were performed, and then the blank injection was performed. In method 4, cleaning of the analysis channel 4 after the end of the analysis and cleaning of the system were performed without performing the needle cleaning after the end of the sample injection into the analysis channel 4, and then the blank injection was performed.

Comparison between the results of method 1 and method 2 indicates that not only the sampling channel 2 and the analysis channel 4 but also the rotor groove in the high-pressure valve 10 can be cleaned by performing the system cleaning in which the cleaning liquid and the mobile phase are caused to flow in a state where the sampling channel 2 is interposed between the liquid supplier 6 and the analysis channel 4, and a high carry-over elimination effect can be obtained as a whole. The result of method 3 indicates that a certain carry-over elimination effect can be obtained by combining the needle cleaning and the cleaning of the analysis channel 4, and comparison between the result of method 4 and method 3 indicates that a higher carry-over elimination effect can be obtained by combining the cleaning of the analysis channel 4 and the system cleaning. In methods 3 and 4, the ratio of carry-over with respect to LOQ decreases to equal to or less than 10% by four times of blank injection, and it can be evaluated that the elimination of carry-over has been sufficiently achieved.

The example described above is merely an example of an embodiment of the liquid chromatograph and the analysis method according to the present invention. An embodiment of the liquid chromatograph and the analysis method according to the present invention is as follows.

An embodiment of the liquid chromatograph according to the present invention includes: a sampling channel (2) in which a sampling needle (12) is provided at a tip; a needle movement mechanism (13) that moves the needle (12) three-dimensionally; a liquid supplier (6) configured to be able to supply at least a mobile phase; an analysis channel (4) provided with a separation column (14) for separating components included in a sample; a high-pressure valve (10) having an injection port (16) that is fluidly connected with the sampling channel (2) when the needle (12) is inserted and a port connected with the analysis channel (4), and configured to selectively switched to a loading state and an injecting state, wherein the loading state is a state for fluidly connecting the liquid supplier (6) and the analysis channel (4) not via the sampling channel (2), and the injecting state is a state for fluidly connecting the liquid supplier (6) and the analysis channel (4) via the sampling channel (2) when a tip of the needle (12) is inserted into the injection port (16); and a controller (50) configured to control the needle movement mechanism (13), the liquid supplier (6), and the high-pressure valve (10). The liquid supplier (6), the analysis channel (4), and the high-pressure valve (10) constitute one analysis unit (3) for performing analysis of a sample. The controller (50) is configured to execute, as an analysis operation in the analysis unit (3), a sample injection step of bringing the high-pressure valve (10) into the loading state, sucking a sample from a tip of the needle (12) to hold the sample in the sampling channel (2), then connecting the sampling channel (2) to the injection port (16) and bringing the high-pressure valve (10) into the injecting state, and supplying a mobile phase from the liquid supplier (6), thereby injecting a sample held in the sampling channel (12) into the analysis channel (4), and an analysis step of separating components of a sample injected into the analysis channel (4) in the separation column (14) by bringing the high-pressure valve (10) in the loading state and supplying the mobile phase from the liquid supplier (6), after the sample injection step is ended, in a case where at least a predetermined condition is satisfied, after the analysis step is ended, the controller is configured to execute, as the analysis operation, a system cleaning step of cleaning a liquid flowing route from the sampling channel (2) to the analysis channel (4) by connecting the sampling channel (2) to the injection port (16) and bringing the high-pressure valve (10) into the injecting state to supply the mobile phase and/or a cleaning liquid from the liquid supplier (6).

In a first aspect of the embodiment of the liquid chromatograph, the liquid supplier (6) is configured to be able to switch a liquid to be supplied between the mobile phase and the cleaning liquid by switching a switching valve (22), and the controller (50) is configured to supply at least the cleaning liquid from the liquid supplier (6) in the system cleaning step.

In the first aspect, the controller (50) may be configured to alternately or simultaneously supply the mobile phase and the cleaning liquid from the liquid supplier (6) in the system cleaning step. By doing so, it is possible to obtain a high cleaning effect in a liquid flowing route from the sampling channel (2) to the analysis channel (4), and it is possible to efficiently eliminate carry-over.

In a second aspect of the embodiment of the liquid chromatograph, the predetermined condition includes that concentration of a sample injected into the analysis channel (4) is equal to or greater than a predetermined level. This second aspect can be combined with the first aspect.

In the second aspect, the controller (50) is configured to detect a concentration level of a sample injected into the analysis channel (4) on the basis of information input by a user or on the basis of an output signal of a detector connected to the analysis channel (4), to perform determination as to whether or not the concentration level having been detected is equal to or greater than the predetermined level, and to judge whether or not the predetermined condition is satisfied on the basis of a result of the determination.

In a third aspect of the embodiment of the liquid chromatograph, the controller (50) is configured to execute a blank liquid measurement step after the analysis step is ended, in the blank liquid measurement step, the high-pressure valve (10) is switched to the loading state, and a blank liquid not containing a sample is sucked from a tip of the needle (12) to hold the blank liquid in the sampling channel (2), then the blank liquid held in the sampling channel is injected into the analysis channel by supplying a mobile phase from the liquid supplier in a state where the sampling channel (2) is connected to the injection port (16) and the high-pressure valve (10) is switched to the injecting state, thereby an output signal of a detector connected to the analysis channel for the blank liquid is acquired, and the controller is configured to perform determination as to whether or not the output signal acquired in the blank liquid measurement step is equal to or greater than a predetermined level, and to judge whether or not the predetermined condition is satisfied on the basis of a result of the determination. This third aspect can be combined with the first aspect and/or the second aspect.

In a fourth aspect of the embodiment of the liquid chromatograph, the liquid chromatograph (1) includes at least one other analysis unit (3) provided separately from the analysis unit (3), the other analysis unit (3) has a configuration the same as the analysis unit (3), and the controller (50) is configured to execute an analysis operation including the sample injection step, the analysis step, and the system cleaning step also in the other analysis unit (3) similarly to the analysis operation in the analysis unit (3). The controller (50) is configured, in a case of executing the system cleaning step as the analysis operation in the analysis unit, to execute the sample injection step in the other analysis unit (3) after the sample injection step is ended in the analysis unit and before the system cleaning step is started in the analysis unit, and to execute the system cleaning step in the analysis unit (3) while executing the analysis step in the other analysis unit (3). According to such aspect, it is possible to execute the sample injection step in the other analysis unit (3) to start the analysis step while the analysis step is executed in a certain analysis unit (3), and it is possible to execute the system cleaning step in the analysis unit (3) while the analysis step in the other analysis unit (3), and therefore the efficiency of analysis of a plurality of samples is improved.

In an embodiment of the analysis method using a liquid chromatograph according to the present invention, the liquid chromatograph (1) includes: a sampling channel (2) in which a sampling needle (12) is provided at a tip; a liquid supplier (6) configured to be able to supply at least a mobile phase; an analysis channel (4) provided with a separation column (14) for separating components included in a sample; and a high-pressure valve having an injection port that is fluidly connected with the sampling channel when the needle is inserted and a port connected with the analysis channel, and configured to selectively switched to a loading state and an injecting state, wherein the loading state is a state for fluidly connecting the liquid supplier and the analysis channel not via the sampling channel, and the injecting state is a state for fluidly connecting the liquid supplier and the analysis channel via the sampling channel when a tip of the needle is inserted into the injection port. The analysis method includes: a sample injection step of bringing the high-pressure valve (10) into the loading state, sucking a sample from a tip of the needle (12) to hold the sample in the sampling channel (2), then connecting the sampling channel (2) to the injection port (16) and bringing the high-pressure valve (10) into the injecting state, and supplying a mobile phase from the liquid supplier (6), thereby injecting a sample held in the sampling channel (2) into the analysis channel (4), and an analysis step of separating components of a sample injected into the analysis channel (4) in the separation column (14) by bringing the high-pressure valve (10) in the loading state and supplying the mobile phase from the liquid supplier (6) after the sample injection step is ended, in a case where at least a predetermined condition is satisfied, after the analysis step is ended, the controller is configured to execute, as the analysis operation, a system cleaning step of cleaning a liquid flowing route from the sampling channel (2) to the analysis channel (4) by connecting the sampling channel (2) to the injection port (16) and bringing the high-pressure valve (10) into the injecting state to supply the mobile phase and/or a cleaning liquid from the liquid supplier (6).

In a first aspect of the embodiment of the analysis method, in the system cleaning step, at least the cleaning liquid is supplied from the liquid supplier (6).

In the first aspect, in the system cleaning step, the mobile phase and the cleaning liquid may be alternately or simultaneously supplied from the liquid supplier (6). By doing so, it is possible to obtain a high cleaning effect in a liquid flowing route from the sampling channel (2) to the analysis channel (4), and it is possible to efficiently eliminate carry-over.

In a second aspect of the embodiment of the analysis method, the predetermined condition includes concentration of a sample injected into the analysis channel (4) being equal to or greater than a predetermined level. This second aspect can be combined with the first aspect.

In the second aspect, a concentration level of a sample injected into the analysis channel (4) may be detected on the basis of an output signal of a detector connected to the analysis channel (4), determination as to whether or not the concentration level having been detected is equal to or greater than the predetermined level may be performed, and whether or not the predetermined condition is satisfied may be judged on the basis of a result of the determination.

In a third aspect of the embodiment of the analysis method, a blank liquid measurement step is executed after the analysis step is ended, in the blank liquid measurement step, the high-pressure valve is brought into the loading state and a blank liquid not containing a sample is sucked from a tip of the needle (12) to hold the blank liquid in the sampling channel (2), then the blank liquid held in the sampling channel is injected into the analysis channel by supplying a mobile phase from the liquid supplier in a state where the sampling channel (2) is connected to the injection port (16) and the high-pressure valve (10) is switched to the injecting state, thereby an output signal of a detector connected to the analysis channel for the blank liquid is acquired, determination as to whether or not the output signal acquired in the blank liquid measurement step is equal to or greater than a predetermined level is performed, and whether or not the predetermined condition is satisfied is judged on a basis of a result of the determination. This third aspect can be combined with the first aspect and/or the second aspect.

In a fourth aspect of the embodiment of the analysis method, in the liquid chromatograph (1), the liquid supplier (6), the analysis channel (4), and the high-pressure valve (10) constitute one analysis unit (3) for performing analysis of a sample, and at least one other analysis unit (3) having a configuration the same as the analysis unit (3) is provided separately from the analysis unit (3), the analysis method includes the sample injection step, the analysis step, and the system cleaning step as steps executed in each of the analysis unit (3) and the other analysis unit (3), and in a case of executing the system cleaning step in the analysis unit, the sample injection step in the other analysis unit (3) is executed after the sample injection step in the analysis unit (3) is ended and before the system cleaning step in the analysis unit is started, and the system cleaning step in the analysis unit (3) is executed while executing the analysis step in the other analysis unit (3). According to such aspect, it is possible to execute the sample injection step in the other analysis unit (3) to start the analysis step while the analysis step is executed in a certain analysis unit (3), and it is possible to execute the system cleaning step in the analysis unit (3) while the analysis step in the other analysis unit (3), and therefore the efficiency of analysis of a plurality of samples is improved.

DESCRIPTION OF REFERENCE SIGNS 1 liquid chromatograph
2 sampling channel
3 analysis unit
4 analysis channel
6 liquid supplier
10 high-pressure valve
12 needle
14 separation column
16 injection port
18;46 mobile phase pump
20;48 cleaning liquid pump
22;40 switching valve
24 sample container
26;28 selection valve
34 low-pressure valve
36 measuring pump
42 mobile phase supply channel
44 cleaning liquid supply channel
50 controller

What is claimed is:

1. A liquid chromatograph comprising: a sampling channel in which a sampling needle is provided at a tip; a needle movement mechanism that moves the needle three-dimensionally; a liquid supplier configured to be able to supply at least a mobile phase; an analysis channel provided with a separation column for separating components included in a sample; a pressure valve having an injection port that is fluidly connected with the sampling channel when the needle is inserted and a port connected with the analysis channel, and configured to selectively switched to a loading state and an injecting state, wherein the loading state is a state for fluidly connecting the liquid supplier and the analysis channel not via the sampling channel, and the injecting state is a state for fluidly connecting the liquid supplier and the analysis channel via the sampling channel when a tip of the needle is inserted into the injection port; and a controller configured to control the needle movement mechanism, the liquid supplier, and the pressure valve, wherein the liquid supplier, the analysis channel, and the pressure valve constitute one analysis unit for performing analysis of a sample, and the controller is configured to execute, as an analysis operation in the analysis unit, a sample injection step of bringing the pressure valve into the loading state, sucking a sample from a tip of the needle to hold the sample in the sampling channel, then connecting the sampling channel to the injection port and bringing the pressure valve into the injecting state, and supplying a mobile phase from the liquid supplier, thereby injecting a sample held in the sampling channel into the analysis channel, and an analysis step of separating components of a sample injected into the analysis channel in the separation column by bringing the pressure valve in the loading state and supplying the mobile phase from the liquid supplier, after the sample injection step is ended, in a case where at least a predetermined condition is satisfied, after the analysis step is ended, the controller is configured to execute, as the analysis operation, a system cleaning step of cleaning a liquid flowing route from the sampling channel to the analysis channel by connecting the sampling channel to the injection port and bringing the pressure valve into the injecting state to supply the mobile phase and/or a cleaning liquid from the liquid supplier.

2. The liquid chromatograph according to claim 1, wherein
the liquid supplier is configured to be able to switch a liquid to be supplied between the mobile phase and the cleaning liquid by switching a switching valve, and
the controller is configured to supply at least the cleaning liquid from the liquid supplier in the system cleaning step.

3. The liquid chromatograph according to claim 2, wherein the controller is configured to alternately or simultaneously supply the mobile phase and the cleaning liquid from the liquid supplier in the system cleaning step.

4. The liquid chromatograph according to claim 1, wherein the predetermined condition includes that concentration of a sample injected into the analysis channel is equal to or greater than a predetermined level.

5. The liquid chromatograph according to claim 4, wherein the controller is configured to detect a concentration level of a sample injected into the analysis channel on a basis of information input by a user or on a basis of an output signal of a detector connected to the analysis channel, to perform determination as to whether or not the concentration level having been detected is equal to or greater than the predetermined level, and to judge whether or not the predetermined condition is satisfied on a basis of a result of the determination.

6. The liquid chromatograph according to claim 1, wherein the controller is configured to execute a blank liquid measurement step after the analysis step is ended, in the blank liquid measurement step, the pressure valve has switched to the loading state and a blank liquid not containing a sample is sucked from a tip of the needle to hold the blank liquid in the sampling channel, then the blank liquid held in the sampling channel is injected into the analysis channel by supplying a mobile phase from the liquid supplier in a state where the sampling channel is connected to the injection port and the pressure valve is switched to the injecting state, thereby an output signal of a detector connected to the analysis channel for the blank liquid is acquired, and the controller is configured to perform determination as to whether or not the output signal acquired in the blank liquid measurement step is equal to or greater than a predetermined level, and to judge whether or not the predetermined condition is satisfied on a basis of a result of the determination.

7. The liquid chromatograph according to claim 1, wherein the liquid chromatograph includes at least one other analysis unit provided separately from the analysis unit, and the other analysis unit has a configuration the same as the analysis unit, the controller is configured to execute an analysis operation including the sample injection step, the analysis step, and the system cleaning step also in the other analysis unit, in a case of executing the system cleaning step as the analysis operation in the analysis unit, to execute the sample injection step in the other analysis unit after the sample injection step is ended in the analysis unit and before the system cleaning step is started in the analysis unit, and to execute the system cleaning step in the analysis unit while executing the analysis step in the other analysis unit.

8. An analysis method using a liquid chromatography wherein the liquid chromatograph includes a sampling channel in which a sampling needle is provided at a tip, a liquid supplier configured to be able to supply at least a mobile phase, an analysis channel provided with a separation column for separating components included in a sample, and a pressure valve having an injection port that is fluidly connected with the sampling channel when the needle is inserted and a port connected with the analysis channel, and configured to selectively switched to a loading state and an injecting state, wherein the loading state is a state for fluidly connecting the liquid supplier and the analysis channel not via the sampling channel, and the injecting state is a state for fluidly connecting the liquid supplier and the analysis channel via the sampling channel when a tip of the needle is inserted into the injection port, and the analysis method includes a sample injection step of bringing the pressure valve into the loading state, sucking a sample from a tip of the needle to hold the sample in the sampling channel, then connecting the sampling channel to the injection port and bringing the pressure valve into the injecting state, and supplying a mobile phase from the liquid supplier, thereby injecting a sample held in the sampling channel into the analysis channel, and an analysis step of separating components of a sample injected into the analysis channel in the separation column by bringing the pressure valve in the loading state and supplying the mobile phase from the liquid supplier after the sample injection step is ended, in a case where at least a predetermined condition is satisfied, after the analysis step is ended, the controller is configured to execute, as the analysis operation, a system cleaning step of cleaning a liquid flowing route from the sampling channel to the analysis channel by connecting the sampling channel to the injection port and bringing the pressure valve into the injecting state to supply the mobile phase and/or a cleaning liquid from the liquid supplier.

9. The analysis method according to claim 8, wherein in the system cleaning step, at least the cleaning liquid is supplied from the liquid supplier.

10. The analysis method according to claim 9, wherein in the system cleaning step, the mobile phase and the cleaning liquid are alternately or simultaneously supplied from the liquid supplier.

11. The analysis method according to claim 8, wherein the predetermined condition includes concentration of a sample injected into the analysis channel being equal to or greater than a predetermined level.

12. The analysis method according to claim 11, wherein a concentration level of a sample injected into the analysis channel is detected on a basis of an output signal of a detector connected to the analysis channel, determination as to whether or not the concentration level having been detected is equal to or greater than the predetermined level is performed, and whether or not the predetermined condition is satisfied is judged on a basis of a result of the determination.

13. The analysis method according to claim 8, wherein a blank liquid measurement step is executed after the analysis step is ended, in the blank liquid measurement step, the pressure valve is brought into the loading state and a blank liquid not containing a sample is sucked from a tip of the needle to hold the blank liquid in the sampling channel, then the blank liquid held in the sampling channel is injected into the analysis channel by supplying a mobile phase from the liquid supplier in a state where the sampling channel is connected to the injection port and the pressure valve is switched to the injecting state, thereby an output signal of a detector connected to the analysis channel for the blank liquid is acquired, determination as to whether or not the output signal acquired in the blank liquid measurement step is equal to or greater than a predetermined level is performed, and whether or not the predetermined condition is satisfied is judged on a basis of a result of the determination.

14. The analysis method according to claim 8, wherein in the liquid chromatography the liquid supplier, the analysis channel, and the pressure valve constitute one analysis unit for performing analysis of a sample, and at least one other analysis unit having a configuration the same as the analysis unit is provided separately from the analysis unit, the analysis method includes the sample injection step, the analysis step, and the system cleaning step as steps executed in each of the analysis unit and the other analysis unit, and in a case of executing the system cleaning step in the analysis unit, the sample injection step in the other analysis unit is executed after the sample injection step in the analysis unit is ended and before the system cleaning step in the analysis unit is started, and the system cleaning step in the analysis unit is executed while executing the analysis step in the other analysis unit.

* * * * *